United States Patent
Tegtmeier et al.

(10) Patent No.: US 10,901,764 B2
(45) Date of Patent: Jan. 26, 2021

(54) LAYERED MACHINE IMAGES

(71) Applicant: Amazon Technologies, Inc., Reno, NV (US)

(72) Inventors: Kevin A. Tegtmeier, Seattle, WA (US); Eden G. Adogla, Seattle, WA (US); Kent D. Forschmiedt, Shoreline, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 14/513,154

(22) Filed: Oct. 13, 2014

(65) Prior Publication Data

US 2015/0033229 A1 Jan. 29, 2015

Related U.S. Application Data

(62) Division of application No. 13/167,174, filed on Jun. 23, 2011, now Pat. No. 8,862,741.

(51) Int. Cl.
| | |
|---|---|
| *G06F 9/455* | (2018.01) |
| *H04L 12/24* | (2006.01) |
| *H04L 29/08* | (2006.01) |
| *G06F 8/71* | (2018.01) |
| *G06F 8/70* | (2018.01) |

(52) U.S. Cl.
CPC .............. *G06F 9/455* (2013.01); *H04L 41/08* (2013.01); *H04L 41/145* (2013.01); *H04L 67/10* (2013.01); *H04L 67/2842* (2013.01); *G06F 8/70* (2013.01); *G06F 8/71* (2013.01); *G06F 2009/4557* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 5,559,945 | A | 9/1996 | Beaudet |
| 7,571,157 | B2 | 8/2009 | Chowdhury |
| 7,577,722 | B1 | 8/2009 | Khandekar |
| 8,583,673 | B2 | 11/2013 | Tarek |
| 2002/0054146 | A1 | 5/2002 | Fukumoto |

(Continued)

*Primary Examiner* — Lewis A Bullock, Jr.
*Assistant Examiner* — Melissa A Headly
(74) *Attorney, Agent, or Firm* — Davis Wright Tremaine LLP (57) ABSTRACT

In certain embodiments, a computer-implemented method includes accessing user selection data that includes selections associated with computing system resources, determining two or more machine image layers from available machine image layers to instantiate on a particular computing system resource, and determining that a particular machine image layer is not cached locally on one or more memory devices of the particular computing system resource. The method includes, in response to determining that the particular machine image layer is not cached locally on one or more memory devices, accessing a stored copy of the particular machine image layer residing in memory external to the particular computing system resource and caching the stored copy of the particular machine image layer on the one or more memory devices of the particular computing system resource. The method further includes instantiating the particular machine image layer on the particular computing system resource.

18 Claims, 4 Drawing Sheets

(56) References Cited

U.S. PATENT DOCUMENTS

| | | |
|---|---|---|
| 2007/0105589 A1 | 5/2007 | Lu |
| 2009/0300641 A1* | 12/2009 | Friedman ............ G06F 11/3664 |
| | | 718/104 |
| 2010/0325191 A1 | 12/2010 | Jung |
| 2012/0072903 A1* | 3/2012 | Joukov ..................... G06F 8/63 |
| | | 717/175 |
| 2012/0192175 A1* | 7/2012 | Dorai .................. G06F 9/45558 |
| | | 718/1 |
| 2012/0240110 A1 | 9/2012 | Breitgand |
| 2012/0266161 A1 | 10/2012 | Baron |

* cited by examiner

LAYERED MACHINE IMAGES

CROSS REFERENCE TO RELATED APPLICATIONS

This application is a divisional of U.S. patent application Ser. No. 13/167,174 filed Jun. 23, 2011, which is incorporated herein by reference.

BACKGROUND

Online service providers offer many products and services to their clients. One such service is the ability of a client to purchase and operate a certain amount of computing capacity on a remote computer system. For example, a client may submit a request to create and operate a virtual web server running on a host server of the online service provider. Typically, the instantiation of computing capacity on a computer system involves the creation and execution of a machine image. The process of selecting, creating, and executing a machine image, however, is often cumbersome and inefficient.

BRIEF DESCRIPTION OF THE DRAWINGS

For a more complete understanding of the present disclosure and its advantages, reference is made to the following descriptions, taken in conjunction with the accompanying drawings, in which.

DESCRIPTION OF EXAMPLE EMBODIMENTS

Instantiating a virtual machine on a host computer system often involves the selection, creation, and instantiation of a machine image. A machine image may include data that, when executed, creates or "instantiates" a replica of a particular computer system. For example, machine images may include an operating system and one or more applications to perform a specific task. As a particular example, a machine image for a web server may include an operating system such as LINUX, a web server application such as APACHE, and a database application such as MYSQL. Machine images allow for multiple instances of the same particular computer system to be instantiated quickly either as a stand alone computer system or as a virtual machine running on a host computer system.

While the use of machine images enables customers of online service providers to instantiate a particular virtual machine on a host computer system, choosing a proper machine image to instantiate is often difficult and cumbersome. For example, a customer of an online service provider may desire to instantiate a virtual web server on a host computer system of the online service provider. As a result, the customer may be presented with a selection of pre-assembled machine images to instantiate on the host computer system. However, it may be difficult for some customers to determine which of the pre-assembled machine images are appropriate for their particular application.

Another disadvantage of typical machine images is that the online service provider stores a large number of unique machine images despite the machine images having common elements. For example, one customer may create and utilize a machine image for a web server that includes a particular version of LINUX as the operating system and JETTY for the web server application. Another customer, however, may desire a machine image for a web server that includes the same version of LINUX as the operating system and a different web server application such as TOMCAT. Even though both machine images include the same version of LINUX as the operating system, the online service provider stores two separate machine images for the customers. This creates an increased demand for storage space and other possible issues.

Certain of the present disclosure provide machine images that are created in real-time using pre-approved and pre-assembled machine image layers. For example, machine image layers may be created using various techniques, examples of which are described herein, and made available to customers to use in custom machine images. One or more of the pre-approved machine image layers may be selected and executed in order to instantiate a desired computing resource for the customer. FIGS. 1 through 6 below illustrate layered machine images according to certain embodiments of the present disclosure.

Figure 1:
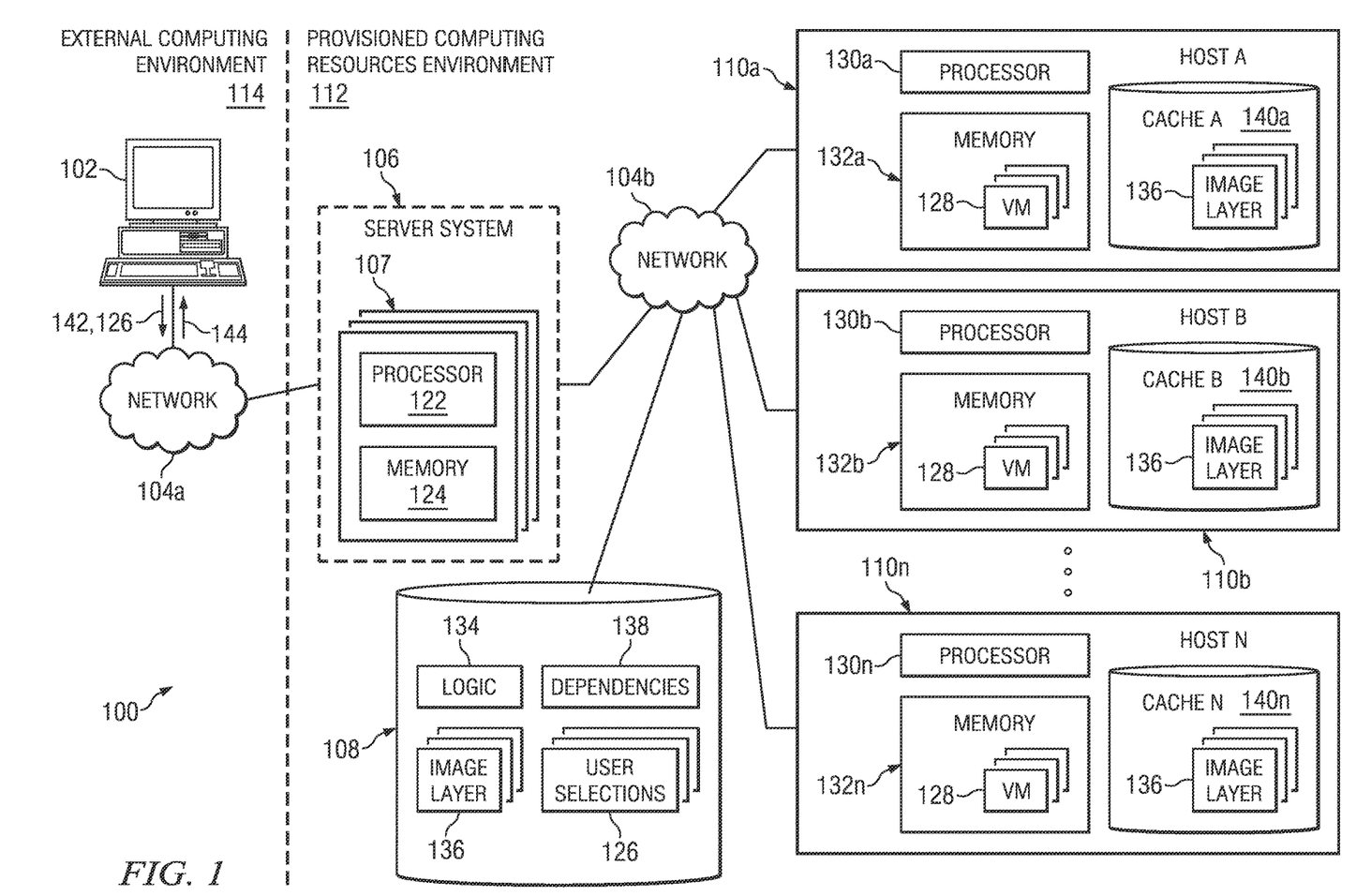
FIG. 1 illustrates an example system for providing machine image layers, according to certain embodiments of the present disclosure.

FIG. 1 illustrates an example system 100 for instantiating machine images on a host computing system, according to certain embodiments of the present disclosure. In the illustrated example, system 100 includes a user system 102, networks 104a and 104b, a server system 106, a storage module 108, and one or more hosts 110. In certain embodiments, server system 106, storage module 108, and hosts 110 may be communicatively coupled together over a high speed communication network such as network 104b and collectively may comprise a computing infrastructure, which may be referred to as a provisioned computing resources environment 112. User system 102 and/or network 104a may be external to the provisioned computing resources environment and may be referred to as an external computing environment 114. Although system 100 is illustrated and primarily described as including particular components, the present disclosure contemplates system 100 including any suitable components, according to particular needs.

In general, provisioned computing resources environment 112 (including, for example, one or more of server system 106, storage module 108, and hosts 110) provides a collection of remote computing services offered over a network (which may or may not be network 104a). Those computing services may include, for example, storage, compute processing, networking, applications, or any other suitable computing resources that may be made available over a network. In certain embodiments, entities accessing those computing services may gain access to a suite of elastic information technology (IT) infrastructure services (e.g., computing resources on hosts 110) as the entity requests those services. Provisioned computing resources environment 112 may provide a scalable, reliable, and secure distributed computing infrastructure.

To gain access to computing resources on hosts 110, user system 102 may first transmit one or more user selections 126 to provisioned computing resources environment 112. In general, user selections 126 indicate a desired configuration for a particular computing environment to be instantiated on hosts 110. As an illustration, user selections 126 may indicate, among other things, a particular operating system for a desired virtual machine 128 to be instantiated on hosts 110. After user selections 126 are transmitted by user system 102, provisioned computing resources environment 112 may access user selections 126 stored in storage module 108 and then determine one or more machine image layers 136 to execute on a particular host 110. Machine image layers 136 are described in more detail below. In particular, embodiments of instantiating machine image layers 136 are described below in reference to FIG. 2, and embodiments of creating machine image layers 136 are described below in reference to FIGS. 3 and 4.

User system 102 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, personal data assistant (PDA), one or more Internet Protocol (IP) telephones, smart phones, tablet computers, one or more servers, a server pool, one or more processors within these or other devices, or any other suitable processing device. User system 102 may be a stand-alone computer or may be a part of a larger network of computers associated with an entity.

Networks 104a and 104b facilitate wireless or wireline communication. Networks 104a and 104b may communicate, for example, IP packets, Frame Relay frames, Asynchronous Transfer Mode (ATM) cells, voice, video, data, and other suitable information between network addresses. Networks 104a and 104b may include one or more personal area networks (PANs), local area networks (LANs), a wireless LAN (WLAN), a virtual private network (VPN), radio access networks (RANs), metropolitan area networks (MANs), wide area networks (WANs), mobile networks (e.g., using WiMax (802.16), WiFi (802.11), 3G, or any other suitable wireless technologies in any suitable combination), all or a portion of the global computer network known as the Internet, an extranet, a satellite network, and/or any other communication system or systems at one or more locations, any of which may be any suitable combination of wireless and wireline. Networks 104a and 104b may be combined, in whole or in part, or may be distinct, according to particular needs.

Server system 106 may include one or more computer systems 107 at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, one or more servers, a server pool, one or more processors within these or other devices, or any other suitable processing device. Server system 106 may be a stand-alone computer or may be a part of a larger network of computers associated with an entity.

Each computer system 107 of server system 106 may include processing unit 122 and memory unit 124. Processing unit 122 may include one or more microprocessors, controllers, or any other suitable computing devices or resources. Processing unit 122 may work, either alone or with other components of system 100, to provide a portion or all of the functionality of system 100 described herein. Memory unit 124 may take the form of volatile or non-volatile memory including, without limitation, magnetic media, optical media, RAM, ROM, removable media, or any other suitable memory component.

Server system 106 may facilitate making computing resources on hosts 110 available over a network (which may or may not be network 104a) and may manage the provision of computing resources on hosts 110 to other computing systems over the network. For example, server system 106 may control access to and rationing of computing resources on hosts 110 to other computing systems over a network.

Server system 106 may be operable to access or otherwise communicate with a storage module 108. In some embodiments, for example, server system 106 communicates with storage module 108 over network 104b. Storage module 108 may take the form of volatile or non-volatile memory including, without limitation, magnetic media, optical media, RAM, ROM, removable media, or any other suitable memory component. In certain embodiments, a portion of all of storage module 108 may include a database, such as one or more SQL servers or relational databases. Storage module 108 may be a part of or distinct from memory unit 124 of server system 106.

Storage module 108 may store a variety of information and applications that may be used by server system 106, hosts 110, or other suitable components of system 100. In the illustrated example, storage module 108 may store logic 134, machine image layers 136, dependencies 138, and user selections 126, each of which are described in greater detail below. Although storage module 108 is described as including this particular information and applications, storage module 108 may store any other suitable information and applications. Furthermore, although these particular information and applications are described as being stored in storage module 108, the present description contemplates storing this particular information and applications in any suitable location, according to particular needs.

Hosts 110 may include any suitable computing resources that may be made available over a network (which may or may not be network 104a). Hosts 110 may be communicatively coupled to network 104b and may include any suitable combination of hardware, firmware, and software. As just a few examples, hosts 110 may include any suitable combination of applications, power, processors, storage, and any other suitable computing resources that may be made available over a network. Hosts 110 may each be substantially similar to one another or may be heterogeneous. As described above, entities accessing computing services provided by provisioned computing resources environment 112 may gain access to a suite of elastic IT infrastructure services (e.g., computing resources on hosts 110) as the entity requests those services. Provisioned computing resources environment 112 may provide a scalable, reliable, and secure distributed computing infrastructure. Herein "available" computer resources include computer resources that are currently available to be provisioned, computer resources that are currently in use but may become available for provisioning in the future, or computer resources that may be added to a pool of available computer resources and become available for provisioning in the future.

In the illustrated example, each host 110 comprises a processing unit 130, a memory unit 132, and a cache memory unit 140. Processing unit 130 may include one or more microprocessors, controllers, or any other suitable computing devices or resources. Processing unit 130 may work, either alone or with other components of system 100, to provide a portion or all of the functionality of system 100 described herein. Memory unit 132 and cache memory unit 140 may take the form of volatile or non-volatile memory including, without limitation, magnetic media, optical media, RAM, ROM, removable media, or any other suitable memory component. In certain embodiments, a portion or all of memory unit 132 may include a database, such as one or more structured query language (SQL) servers or relational databases.

In certain embodiments, cache memory unit 140 may be internal or external to processing unit 130 and may include one or more instruction caches or one or more data caches. Instructions in the instruction caches may be copies of instructions in memory unit 132 or storage module 108, and the instruction caches may speed up retrieval of those instructions by processing unit 130. Data in the data caches may include any suitable combination of copies of data in memory unit 132 or storage module 108 for instructions executing at processing unit 130 to operate on; the results of previous instructions executed at processing unit 130 for access by subsequent instructions executing at processing unit 130, or for writing to memory unit 132 or storage module 108; and other suitable data. The data caches may speed up read or write operations by processing unit 130. In certain embodiments, as described in more detail below, machine image layers 136 may reside in cache memory units 140 in order to allow computing resources such as virtual machines 128 on hosts 110 to be quickly and efficiently instantiated.

Logic 134 may comprise any suitable combination of hardware, firmware, and software. Logic 134 may handle any function or method described herein including analyzing user selections 126, determining which machine image layers 136 to instantiate based on user selections 126, and instantiating the determined machine image layers 136 on a particular host 110. In certain embodiments, logic 134 may be a part of a larger application for monitoring or otherwise managing the provision of computing resources 110 over a network.

As described briefly above, machine image layers 136 may be used to instantiate computer resources such as a virtual machine 128 on a particular host 110. Each machine image layer 136 comprises data that, when combined with one or more other machine image layers 136, forms a complete machine image which may then be used to instantiate a particular computer resource. Examples of particular machine image layers 136 may include: a machine image layer 136 for an operating system such as LINUX variants, MICROSOFT WINDOWS, and the like; a machine image layer 136 for a web server application such as TOMCAT, JETTY, and the like; a machine image layer 136 for a database application such as MYSQL and the like; a machine image layer 136 for a scripting language such as PHP and the like; and a machine image layer 136 for a custom customer application. While particular examples of machine image layers 136 have been cited, the disclosure contemplates machine image layers 136 for any appropriate computer application.

In some embodiments, machine image layers 136 comprise one or more software packages that have been assembled together. For example, a machine image layer 136 for a particular LINUX operating system may comprise various software packages that have been selected and grouped together based on a package dependency graph provided by the particular LINUX distributor. In other embodiments, machine image layers 136 may be created by grouping commonly-used software packages together. Example embodiments of the creation of machine image layers 136 are described in more detail below in reference to FIGS. 3 and 4.

Machine image layers 136 may offer distinct advantages to customers of online service providers. For example, certain embodiment may present a customer with a series of choices on user system 102 that allows the customer to build custom machine images using pre-assembled and pre-approved machine image layers 136. As an illustration, a customer wanting to instantiate a web server may first be presented with the choice of pre-approved machine image layers 136 for various operating systems (e.g., LINUX variants, WINDOWS, etc.). Then, based on the customer's selection of operating system, the customer may be presented with appropriate pre-approved machine image layers 136 for particular web servers (e.g., TOMCAT, JETTY, etc.) that will function with the chosen operating system machine image layer 136. The customer experience may be improved as a result of offering the customer choices of pre-approved machine image layers 136.

Furthermore, in certain embodiments, image layers 136 may reduce storage space requirements and lower image launch times. For example, by storing machine image layers 136 instead of whole machine images and then assembling a machine image in real-time per a customer request using the stored machine image layers 136, an online service provider may have lower storage requirements. Furthermore, because certain popular machine image layers 136 may already reside in cache (e.g., cache memory unit 140), the instantiation of a machine image that includes the certain machine image layer 136 may require less time. That is, if two machine images both utilize a particular image layer 136, the particular image layer 136 may only need to be cached once.

In operation of an example embodiment of system 100, server system 106 may receive via network 104*a* a request 142 from user system 102 for computing system resources. In some embodiments, for example, request 142 may be for a virtual machine 128 to be instantiated on hosts 110. In response to request 142, server system 106 may transmit to user system 102 a list 144 of available machine image layers 136. In some embodiments, available machine image layers 136 may be presented to a user of user system 102 in a series of steps. For example, a first group of machine image layers 136 may be initially presented to user system 102 for selection by the user. After a selection from the first group of machine image layers 136 has been made, a second group of machine image layers 136 may be presented to user system 102 for selection by the user. In some embodiments, the second group of machine image layers 136 is based on the selection from the first group of machine image layers 136. This process may be repeated any number of times until an appropriate number of selections of machine image layers 136 have been made to form a complete machine image. The selections may then be transmitted as user selections 126 to server system 106 and stored on storage module 108.

Provisioned computing resources environment 112 or a particular host 110 may access user selections 126 in order to create and instantiate an appropriate machine image on hosts 110. For example, server system 106 or a particular host 110 may access user selections 126 and determine that a particular group of machine image layers 136 should be combined to form a machine image for the customer associated with the accessed user selections 126. After determining the particular group of machine image layers 136 to combine to form the machine image, server system 106 or a particular host 110 may access cache memory unit 140 of the particular host 110 and determine whether any of the particular group of machine image layers 136 are currently stored in the cache memory unit 140. If any of the particular machine image layers 136 are currently stored in cache memory unit 140, the particular machine image layers 136 may be instantiated on the particular host 110 without retrieving the particular machine image layers 136 from storage module 108. As a result, the time required to instantiate the particular machine image layers 136 may be reduced.

If, however, any of the particular machine image layers 136 are not currently stored in cache memory unit 140, a stored copy of the particular machine image layers 136 may be accessed from storage module 108 or any storage module external to hosts 110. In some embodiments, the stored copy of the particular machine image layer may be located using a uniform resource locator (URL) or any other appropriate method. After accessing the stored copy of the particular machine image layers 136 in storage module 108, the stored copy of the particular machine image layers 136 may then be received at the particular host 110, stored in cache memory unit 140, and instantiated on the particular host 110. An example embodiment of the instantiation of machine image layers 136 is described below in reference to FIG. 2.

Figure 2:
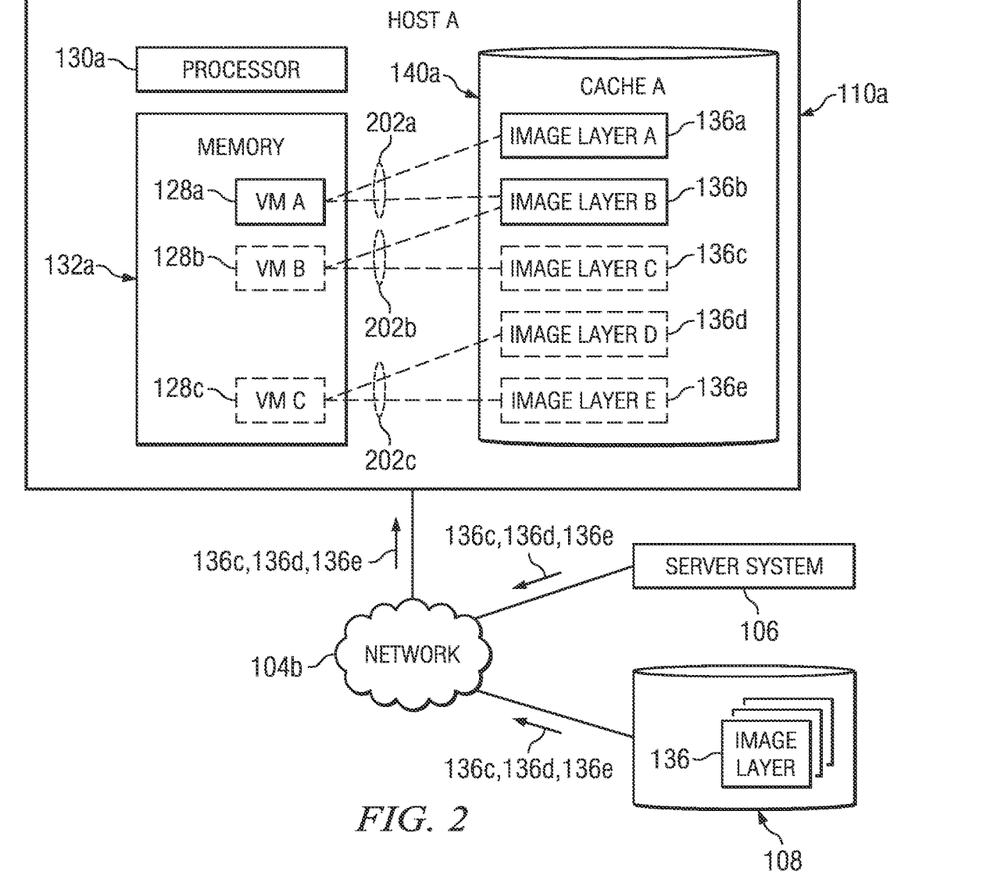
FIG. 2 illustrates example processing of machine image layers, which may be performed by the example system of FIG. 1, according to certain embodiments of the present disclosure.

FIG. 2 illustrates an example embodiment of the instantiation of virtual machines 128a-128c on host 110a using machine image layers 136a-136e. In this particular embodiment, which is provided for illustrative purposes only, virtual machines 128b and 128c are being instantiated on host 110a that already includes instantiated virtual machine 128a. In this embodiment, virtual machine 128a was instantiated using a machine image composed of machine image layers 136a and 136b (as depicted with lines 202a). That is, virtual machine 128a was instantiated on host 110a by executing machine image layers 136a and 136b. In some embodiments, however, a virtual machine 128 may be initially instantiated using only a single machine image layer 136 such as a machine image layer 136 of an operating system. In such embodiments, additional applications may be executed on an instantiated virtual machine 128 by executing additional machine image layers 136 such as machine image layers 136 of a web server, a database application, and the like.

As depicted in FIG. 2, virtual machine 128b is to be instantiated on host 110a using machine image layers 136b and 136c (as depicted with lines 202b). It may be determined, for example, that virtual machine 128b should be instantiated using machine image layers 136b and 136c by accessing and analyzing user selections 126. In the illustrated embodiment, machine image layer 136b already exists in cache memory unit 140a since it was previously utilized to instantiate virtual machine 128a. Therefore, machine image layers 136b may be substantially immediately executed on host 110a to at least partially instantiate virtual machine 128b. Also, because machine image layer 136b already exists in cache memory unit 140a, a stored copy of machine image layer 136b does not need to be retrieved from storage module 108, thereby decreasing the amount of time required to instantiate virtual machine 128b. Machine image layer 136c, however, was not previously utilized to instantiate virtual machine 128a and therefore is not in cache memory unit 140a when the process of instantiating virtual machine 128b begins. Consequently, a stored copy of machine image layer 136c is retrieved from storage module 108 and loaded into cache memory unit 140a. In some embodiments, the stored copy of machine image layer 136c may be additionally loaded into memory unit 132a. Machine image layer 136c may then be executed from cache memory unit 140a, memory unit 132a, or directly from storage module 108 in order to further instantiate virtual machine 128b. Once instantiated, virtual machine 128b may be accessed in some embodiments by a user via user system 102 directly through networks 104a and 104b.

In the illustrated embodiment, virtual machine 128c is to be instantiated on host 110a using machine image layers 136d and 136e (as depicted with lines 202c). In this case, however, neither machine image layer 136d nor machine image layer 136e was previously utilized to instantiate any virtual machines 128. Therefore, neither machine image layer 136d nor machine image layer 136e is stored in cache memory unit 140a when the process of instantiating virtual machine 128c begins. Consequently, a stored copy of both machine image layers 136d and 136e are retrieved from storage module 108 and loaded into cache memory unit 140a. In some embodiments, the stored copy of machine image layers 136d and 136e may be additionally loaded into memory unit 132a. Machine image layers 136d and 136e may be executed from cache memory unit 140a, memory unit 132a, or directly from storage module 108 in order to instantiate virtual machine 128c. Even though machine image layers 136d and 136e were retrieved from storage module 108 and therefore likely took more time to execute than if they were already stored in cache memory unit 140a, subsequent instantiations of virtual machines 128 using either machine image layer 136d or 136e may benefit because these machine image layers 136 will be stored in cache memory unit 140a and available for substantially immediate execution.

As described above, machine image layers 136 may be created by grouping certain software packages together. For example, certain software packages for a particular application may be selected and grouped together to form a machine image layer 136 based on a dependency graph. An example embodiment of a dependency graph 300 and a method of grouping software packages to form a machine image layer 136 are illustrated below in reference to FIGS. 3 and 4.

Figure 3:
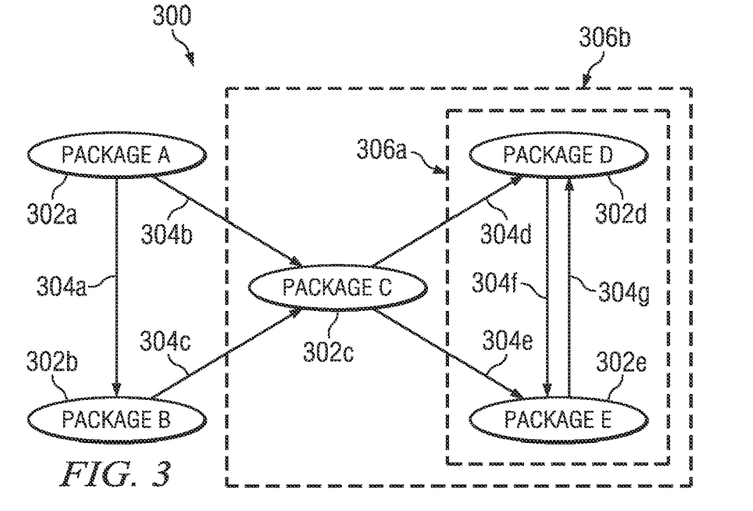
FIG. 3 illustrates an example dependency graph, which may be utilized by the example system of FIG. 1 to create machine image layers according to certain embodiments of the present disclosure.

FIG. 3 illustrates an embodiment of a dependency graph 300 that may be utilized to create machine image layers 136. Dependency graph 300 includes one or more software packages 302a-302e and dependencies 304a-304g. In some embodiments, data from one or more dependency graph 300 may be stored as dependencies 138 in storage module 108.

Dependency graph 300 provides information regarding software packages 302 and dependencies 304 between the software packages 302. For example, a certain embodiment of dependency graph 300 may indicate dependencies 304 between software packages 302 for an operating system. As an illustration, the illustrated embodiment of dependency graph 300 may be for a specific version of the LINUX operating system and software packages 302a-302e may be the various software packages that may be combined to form variations of the specific version of the LINUX operating system. In some embodiments, for example, software package 302a may be chosen for the specific version of the LINUX operating system. However, software package 302a includes dependencies 304a and 304b which indicate that if software package 302a is chosen, software packages 302b and 302c must also be chosen. Furthermore, software package 302c includes dependencies 304d and 304e which indicate that if software package 302c is chosen, software packages 302d and 302e must also be chosen. Consequently, if software package 302a is chosen to be included in the specific version of the LINUX operating system, all of software packages 302b-302e must also be chosen.

As another example, software package 302e includes dependency 304g which indicates that if software package 302e is chosen, software package 302d must also be chosen. Likewise, software package 302d includes dependency 304f which indicates that if software package 302d is chosen, software package 302e must also be chosen. That is, if either of software packages 302d or 302e are chosen to be included in the specific version of the LINUX operating system, both software packages 302d and 302e must be chosen.

In some embodiments, dependency graphs such as dependency graph 300 may be utilized to create machine image layers 136. For example, some embodiments may analyze dependency graph 300 and determine a quantity of dependencies 304 for each software package 302. As described above, for instance, software package 302a includes two direct dependencies (i.e., dependencies 304a and 304b) and the software packages 302 that depend from software package 302a (i.e., software packages 302b and 302c) include two additional unique dependencies (i.e., dependencies 304d and 304e). Consequently, it may be determined that software package 302a requires four additional software packages (i.e., software packages 302b, 302c, 302d, and 302e). Likewise, as described above, both software packages 302d and 302e include a single dependency to each other. Consequently, it may be determined that software packages 302d and 302e each require one additional software package.

After determining the quantity of dependencies 304 for each software package 302, certain software packages 302 may be grouped together based on the determined number of dependencies 304. For example, certain embodiments may group software packages 302 together in order to minimize the number of dependencies 304. In the illustrated embodiment, software packages 302d and 302e may be grouped together into a group 306a since the number of dependencies for each is one. As another example, software packages 302c-302e may be grouped into a group 306b since the number of dependencies for this group would be three. Conversely, certain embodiments may avoid including software package 302a in a group since its selection would require the selection of the remainder of the illustrated software packages 302 (i.e., all of software packages 302b-302e).

In some embodiments, certain software packages 302 may be grouped together based on usage patterns. As one example, one embodiment may determine how frequently software packages 302 have been used or selected in the past. As another example, embodiments may determine software packages 302 that are compatible with a user's prior user selection data 126 or selected machine image layers 136. As another example, a user's browsing history may be compared with other users' browsing history to determine software packages 302 that are likely to be chosen. In yet another example, software packages 302 may be grouped together based on data indicating that users who have chosen a particular software package 302 have also chosen another particular software package 302. While particular examples of usage patterns have been cited, the disclosure contemplates the grouping of software packages 302 together using any appropriate usage data.

In some embodiments, one or more machine image layers 136 may be created from grouped software packages 302. For example, a particular machine image layer 136 may be created that includes the software packages 302 of group 306a described above (i.e., software packages 302d and 302e). In another embodiment, a particular machine image layer 136 may be created that includes the software packages 302 of group 306b described above (i.e., software packages 302c, 302d, and 302e). After machine image layers 136 are created, they may be stored in one or more memory units such as storage module 108.

Figure 4:
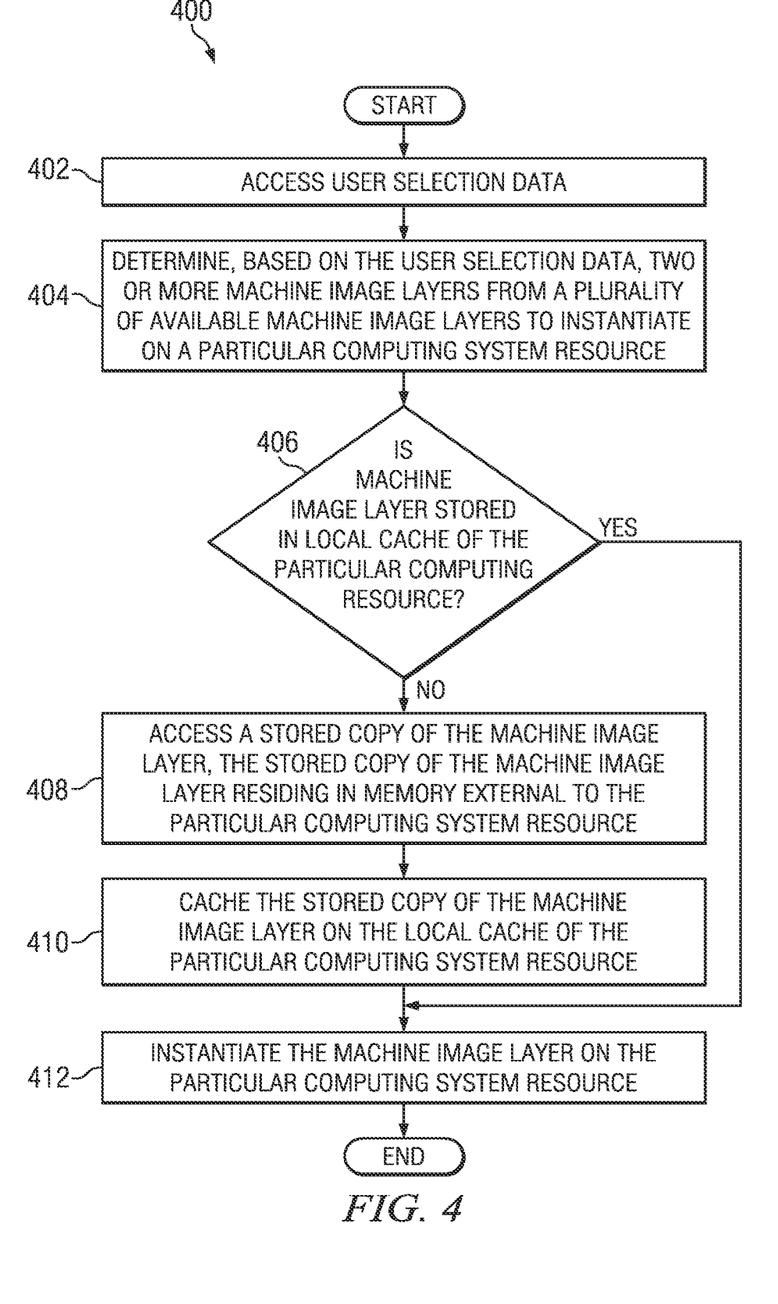
FIG. 4 illustrates an example method for instantiating machine image layers, which may be performed by the example system of FIG. 1 according to certain embodiments of a present disclosure.

FIG. 4 illustrates an example method 400 for providing machine image layers, which may be performed by the example system 100 of FIG. 1 according to certain embodiments of a present disclosure. The method may be implemented in any suitable combination of software, firmware, and hardware. Although particular components may be identified as performing particular steps, the present disclosure contemplates any suitable components performing the steps according to particular needs.

At step 402, user selection data is accessed. In some embodiments, the accessed user selection data is user selection data 126 described above and includes a plurality of selections associated with computing system resources available over a communication network. In some embodiments, the user selection data is accessed by any appropriate system of a provisioned computing resources environment such as one or more computer systems 107 of server system 106 or hosts 110 described above. In some embodiments, the computing system resources that are available over a communication network refer to computing system resources of hosts 110 described above.

At step 404, two or more particular machine image layers from a plurality of available machine image layers are determined, based on the user selection data accessed in step 402, to instantiate on a particular computing system resource. In some embodiments, the plurality of available machine image layers refers to machine image layers 136 and the particular computing system resource refers to a particular host 110 described above. In some embodiments, the determination of step 404 is performed by any appropriate system of a provisioned computing resources environment such as one or more computer systems 107 of server system 106 or hosts 110 described above.

At step 406, it is determined whether the particular machine image layers of step 404 are cached locally on one or more memory devices of the particular computing system resource. In some embodiments, the one or more memory devices of the particular computing system resource of step 406 refer to cache memory units 140 described above. If it is determined that a particular machine image layer of step 404 is cached locally on one or more memory devices of the particular computing system resource, method 400 proceeds to step 412. If it is determined that a particular machine image layer of step 404 is not cached locally on one or more memory devices of the particular computing system resource, method 400 proceeds to step 408.

At step 408, a stored copy of the particular machine image layer of step 404 that was determined to not be cached locally is located and accessed. In some embodiments, the stored copy of the particular machine image layer resides in memory external to the particular computing system resource, such as storage module 108 coupled to server system 106. In some embodiments, a URL is utilized to locate the stored copy of the particular machine image layer of step 404.

At step 410, the stored copy of the particular machine image layer is cached on the one or more memory devices of the particular computing system resource. In some embodiments, the one or more memory devices of the particular computing system resource of step 410 refer to cache memory units 140 described above. After the stored copy of the particular machine image layer is cached on the one or more memory devices of the particular computing system resource in step 410, method 400 proceeds to step 412.

At step 412, the particular machine image layers of step 404 are instantiated on the particular computing system resource. If a particular machine image layer already resided in local cache (i.e., method 400 arrived at step 412 directly from step 406), the particular machine image layer is executed in step 412 from the local cache. If, however, a particular machine image layer did not already reside in local cache (i.e., method 400 arrived at step 412 through steps 408 and 410), the particular machine image layer is executed in step 412 either from the local cache after it is cached in step 410, from the memory external to the particular computing system resource such as storage module 108, or from a local memory unit such as memory unit 132. After step 412, method 400 ends.

In certain embodiments, the above-described method may be performed in response to a user request (e.g., from user system 102). In some embodiments, for example, method 400 may be performed in response to request 142 from user system 102 for computing system resources on hosts 110. In some embodiments, method 400 may be performed in response to any other appropriate event. For example, some embodiments may perform method 400 in response to computer system resources on a particular host 110 becoming available. The disclosure contemplates method 400 being performed at any appropriate time after receiving user request 142.

Figure 5:
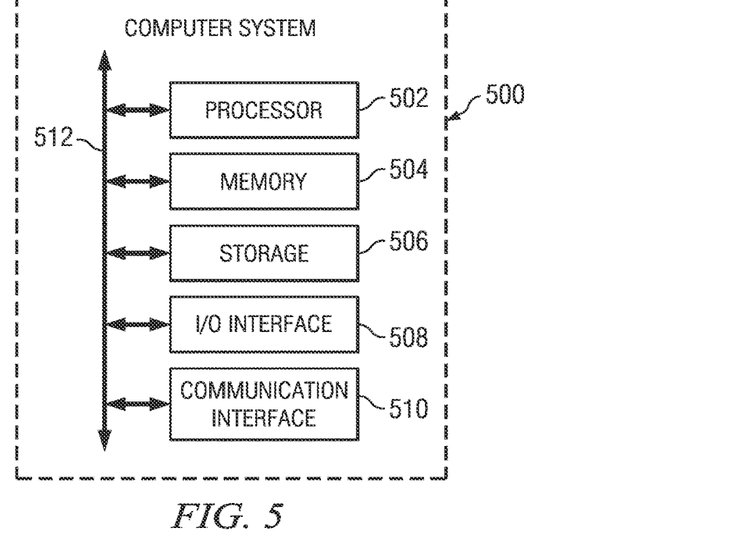
FIGS. 5 and 6 illustrate example computer systems that may be used for one or more portions of the example system of FIG. 1, according to certain embodiments of the present disclosure.

FIG. 5 illustrates an example computer system 500 that may be used for one or more portions of the example system 100 of FIG. 1, according to certain embodiments of the present disclosure. For example, portions or all of user system 102, server system 106, storage module 108, and hosts 110 may be implemented using all of the components, or any appropriate combination of the components, of computer system 500 described below. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. The present disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. The present disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes RAM. This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include an HDD, a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes ROM. Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a PAN, a LAN, a WAN, a MAN, or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 502 (such as, for example, one or more internal registers or caches), one or more portions of memory 504, one or more portions of storage 506, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Figure 6:
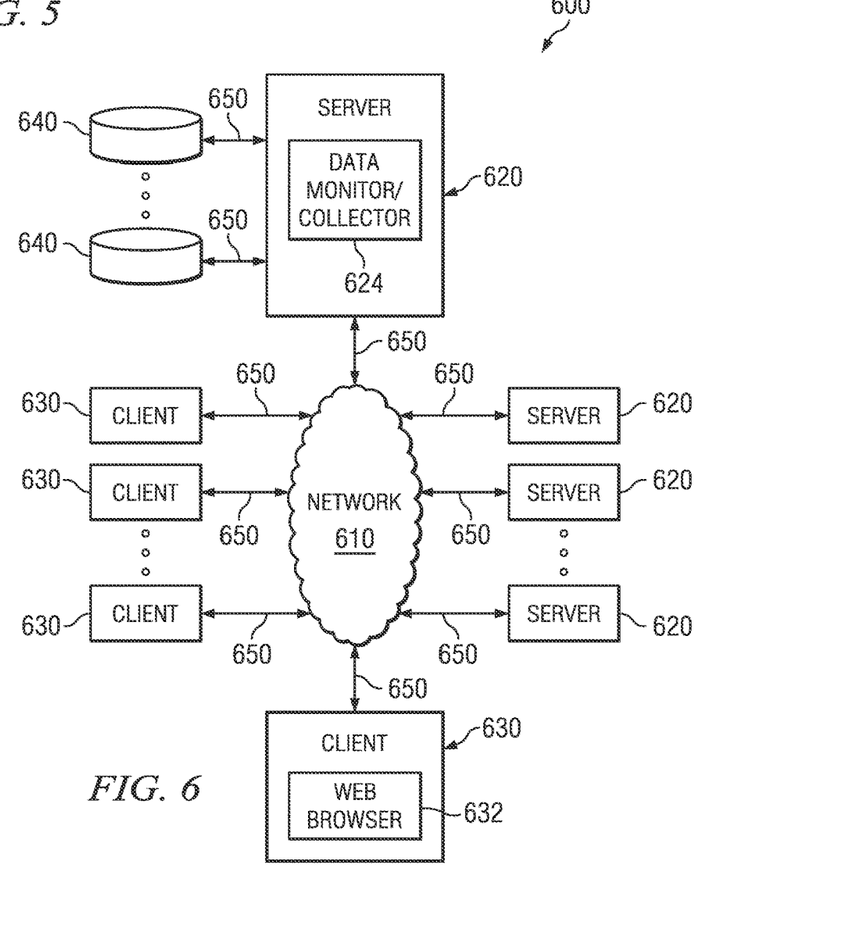

Particular embodiments may be implemented in a network environment. FIG. 6 illustrates an example network environment 600. Network environment 600 includes a network 610 coupling one or more servers 620 and one or more clients 630 to each other. In particular embodiments, network 610 is an intranet, an extranet, VPN, LAN, a WLAN, a WAN, a MAN, a communications network, a satellite network, a portion of the Internet, or another network 610 or a combination of two or more such networks 610. The present disclosure contemplates any suitable network 610.

One or more links 650 couple servers 620 or clients 630 to network 610. In particular embodiments, one or more links 650 each includes one or more wired, wireless, or optical links 650. In particular embodiments, one or more links 650 each includes an intranet, an extranet, a VPN, a LAN, a WLAN, a WAN, a MAN, a communications network, a satellite network, a portion of the Internet, or another link 650 or a combination of two or more such links 650. The present disclosure contemplates any suitable links 650 coupling servers 620 and clients 630 to network 610.

In particular embodiments, each server 620 may be a unitary server or may be a distributed server spanning multiple computers or multiple datacenters. Servers 620 may be of various types, such as, for example and without limitation, web server, news server, mail server, message server, advertising server, file server, application server, exchange server, database server, or proxy server. In particular embodiments, each server 620 may include hardware, software, or embedded logic components or a combination of two or more such components for carrying out the appropriate functionalities implemented or supported by server 620. For example, a web server is generally capable of hosting websites containing web pages or particular elements of web pages. More specifically, a web server may host HTML files or other file types, or may dynamically create or constitute files upon a request, and communicate them to clients 630 in response to HTTP or other requests from clients 630. A mail server is generally capable of providing electronic mail services to various clients 630. A database server is generally capable of providing an interface for managing data stored in one or more data stores.

In particular embodiments, each client 630 may be an electronic device including hardware, software, or embedded logic components or a combination of two or more such components and capable of carrying out the appropriate functionalities implemented or supported by client 630. For example and without limitation, a client 630 may be a desktop computer system, a notebook computer system, a netbook computer system, a handheld electronic device, or a mobile telephone. A client 630 may enable a network user at client 630 to access network 610. A client 630 may have a web browser, such as MICROSOFT INTERNET EXPLORER or MOZILLA FIREFOX, and may have one or more add-ons, plug-ins, or other extensions, such as GOOGLE TOOLBAR or YAHOO TOOLBAR. A client 630 may enable its user to communicate with other users at other clients 630. The present disclosure contemplates any suitable clients 630.

In particular embodiments, one or more data storages 640 may be communicatively linked to one or more servers 620 via one or more links 650. In particular embodiments, data storages 640 may be used to store various types of information. In particular embodiments, the information stored in data storages 640 may be organized according to specific data structures. Particular embodiments may provide interfaces that enable servers 620 or clients 630 to manage (e.g., retrieve, modify, add, or delete) the information stored in data storage 640.

In particular embodiments, a server 620 may include hardware, software, or embedded logic components or a combination of two or more such components for carrying out the appropriate functionalities of server 620. In particular embodiments, a server 620 may also include a data monitor/collector 624. Data monitor/collection 624 may include hardware, software, or embedded logic components or a combination of two or more such components for carrying out the appropriate functionalities implemented or supported by data collector/collector 624. For example and without limitation, data monitor/collector 624 may monitor and collect network traffic data at server 620 and store the collected network traffic data in one or more data storage 640.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method, comprising:
obtaining dependency data for a set of software packages including a first software package and a second software package, the dependency data indicating a number of software packages that depend from the first software package and a number of software packages that depend from the second software package;
determining, based at least in part on user selection data, that a machine image to be instantiated on a computer system comprises at least a first machine image layer and a second machine image layer;
as a result of the first machine image layer being absent from memory of the computer system:
determining a grouped plurality of particular software packages to include with the first machine image layer, the grouped plurality of particular software packages selected based at least on analysis of the dependency data to determine which of the first software package and the second software package has a lesser number of dependent software packages, the grouped plurality of particular software packages further selected based on at least one or more usage patterns determined from prior use of the particular software packages;
creating the first machine image layer comprising the grouped plurality of particular software packages; and
providing, to the computer system, the first machine image layer to be stored with the second machine image layer in the memory of the computer system; and
causing the computer system to provision, using the machine image comprising the first machine image layer and the second machine image layer in the memory, a virtual machine on the computer system.

2. The computer-implemented method of claim 1, wherein:
the method further comprises determining a number of one or more additional software packages from a plurality of dependencies indicated in the dependency data.

3. The computer-implemented method of claim 1, wherein the first machine image layer comprises data that, as a result of being combined with the second machine image layer, forms a machine image usable to instantiate the virtual machine on the computer system.

4. The computer-implemented method of claim 1, wherein the grouped plurality of particular software packages is grouped based at least in part on a frequency that each software package of the grouped plurality of particular software packages has been previously used.

5. The computer-implemented method of claim 1, wherein the grouped plurality of particular software packages is grouped based at least in part on a dependency of a first software package to at least one version of a second software package.

6. A system, comprising:
one or more processing units; and
memory comprising executable instructions that, if executed by the one or more processing units, cause the system to at least:
obtain dependency data for a set of software packages including a first software package and a second software package, the dependency data indicating a number of software packages that depend from the first software package and a number of software packages that depend from the second software packages;
determine, based at least in part on user selection data, that a machine image to be instantiated on a computer system comprises at least a first machine image layer and a second machine image layer;
as a result of the first layer being absent from cache of the computer system:
determine a grouped plurality of particular software packages to include with the first machine image layer, the grouped plurality of particular software packages selected based the number of software packages that depend from the first software package and the number of software packages that depend from the second software packages, the grouped plurality of particular software packages further selected based on at least one or more usage patterns determined from prior use of the particular software packages;
create the first machine image layer comprising the grouped plurality of particular software packages; and
provide, to the computer system, the first machine image layer to be stored in cache of the computer system; and
cause the computer system to provision, using the machine image comprising the first machine image layer and the second machine image layer in cache of the computer system, a virtual machine on the computer system.

7. The system of claim 6, wherein the first machine image layer comprises data that, as a result of being combined with the second machine image layer, forms a machine image usable to instantiate the virtual machine on the computer system.

8. The system of claim 6, wherein the executable instructions further comprise instructions that cause the system to group the set of software packages together based on at least one usage pattern of at least one particular software package of the set of software packages.

9. The system of claim 6, wherein the dependency data comprises a graph representation of a set of software packages, the graph representation based at least in part on the plurality of dependencies.

10. The system of claim 6, wherein the executable instructions further comprise instructions that cause the system to create a multi-machine-image layer virtual machine image based at least in part on the first machine image layer.

11. The system of claim 10, wherein the instructions further comprises instructions that cause the system to instantiate the multi-machine-image layer virtual machine image.

12. The system of claim 6, wherein the executable instructions that create the first machine image layer further comprise instructions that cause the computer system to reference the grouped plurality of particular software packages by uniform resource locator.

13. The system of claim 6, wherein:
the executable instructions further comprise instructions that cause the system to instantiate the second machine image layer from the cache; and
the second machine image layer is not retrieved from an external source subsequent to the determination that the machine image to be instantiated on the computer system comprises at least the first machine image layer and the second machine image layer.

14. A non-transitory computer-readable medium having stored thereon executable instructions that, if executed by one or more processing units of a computer system, cause the computer system to at least:
obtain dependency data for a set of software packages including a first software package and a second software package, the dependency data indicating the first software package has a greater number of software package dependencies than a number of one or more software package dependencies associated with the second software package;
determine to instantiate a machine image on a first computer system, the machine image comprising at least a first machine image layer and a second machine image layer, the machine image based at least in part on user selection data;
as a result of the first machine image layer being absent from the memory of the first computer system:
determine, based at least in part on the dependency data, a grouped plurality of particular software packages to include with the first machine image layer, the grouped plurality of particular software packages comprising the second software package and the one or more software package dependencies associated with the second software package, the grouped plurality of particular software packages further selected based on at least one or more usage patterns determined from prior use of the particular software packages;
create the first machine image layer, the first machine image layer comprising the grouped plurality of particular software packages; and
provide, to the first computer system, the first machine image layer to be stored in the memory of the first computer system with the second machine image layer; and
cause a second computer system to provision, using the machine image comprising the first machine image layer and the second machine image layer in the memory, a virtual machine on the first computer system.

15. The non-transitory computer-readable medium of claim 14, wherein the executable instructions further comprise executable instructions that cause the computer system to determine the quantity of dependencies from the plurality of dependencies.

16. The non-transitory computer-readable medium of claim 15, wherein the executable instructions that cause the computer system to determine the quantity of dependencies include instructions that cause the first computer system to compute a number of software packages that depend directly or indirectly from a chosen software package.

17. The non-transitory computer-readable medium of claim 14, wherein the first machine image layer comprises data that, as a result of being combined with the second machine image layer, forms a machine image usable to instantiate the virtual machine on the second computer system.

18. The non-transitory computer-readable medium of claim 14, wherein the executable instructions further cause the first computer system to:
determine usage patterns for the software packages, the usage patterns indicating a frequency of use for the software packages within a particular machine image layer and a time the software package was last used; and
cause the second computer system to delete, based on the usage patterns determined, the first machine image layer and the second machine image layer from memory.

* * * * *